United States Patent [19]

Baker

[11] Patent Number: 4,930,193
[45] Date of Patent: Jun. 5, 1990

[54] CABLE RETAINING APPARATUS

[75] Inventor: Carl H. Baker, Mackenzie, Canada

[73] Assignee: Baker Cable Ltd., British Columbia, Canada

[21] Appl. No.: 324,563

[22] Filed: Mar. 16, 1989

[30] Foreign Application Priority Data

Nov. 25, 1988 [CA] Canada ................................. 584248

[51] Int. Cl.⁵ .............................................. F16G 11/00
[52] U.S. Cl. ..................................... 24/129 R; 24/130
[58] Field of Search ................ 24/129 R, 129 A, 130, 24/230.5 R

[56] References Cited

U.S. PATENT DOCUMENTS

| 369,079 | 8/1887 | Rowland | 24/129 R |
|---|---|---|---|
| 2,151,609 | 3/1939 | Menderman | 24/129 R |
| 2,174,192 | 9/1939 | Meighan | 24/230.5 R |
| 2,193,236 | 3/1940 | Meighan . | |
| 2,592,696 | 4/1952 | Hoody | 24/129 R |
| 2,872,716 | 2/1959 | Ehmann et al. . | |
| 3,058,184 | 10/1962 | Ritzheimer | 24/129 R |
| 3,276,809 | 10/1966 | Vaines et al. . | |
| 3,984,899 | 10/1976 | Northe . | |
| 4,323,273 | 4/1982 | Sword . | |
| 4,406,042 | 9/1983 | McPhee | 24/130 |
| 4,414,712 | 11/1983 | Beggins | 24/129 R |
| 4,529,240 | 7/1985 | Engel | 24/129 R |

FOREIGN PATENT DOCUMENTS

| 400292 | 6/1968 | Australia | 24/129 R |
|---|---|---|---|
| 680663 | 2/1964 | Canada | 24/129 R |
| 1131346 | 10/1968 | United Kingdom | 24/129 R |

Primary Examiner—Victor N. Sakran
Attorney, Agent, or Firm—John R. Uren

[57] ABSTRACT

A cable retainer or bundling hook for use in retaining cables used in logging and, more particularly, for securing bundles of logs. The retainer is mounted on a cable to which ferrules are attached, one at one end. A first shoulder in a first passageway securely holds the end ferrule of the cable in a press fit. A second passageway substantially parallel to the first passageway has a sidewise and inclined located opening or recess which allows insertion of the cable having a further ferrule. The further ferrule is held in the second passageway by a second ferrule retaining shoulder.

5 Claims, 2 Drawing Sheets

CABLE RETAINING APPARATUS

INTRODUCTION

This invention relates to a cable retainer or bundling hook and, more particularly, to a cable retainer which is used to secure wire rope in logging applications to retain logs in a bundle.

BACKGROUND OF THE INVENTION

Cables with bundling hooks are frequently used to retain logs in a bundle following the cutting of the logs and the transportation of such logs to a site for further processing. For example, logs are typically transported overland a distance to a location where they are unloaded. At the unloading location, they may then be transported by flotation to a mill or other processing location. Prior to flotation, the logs are formed into log bundles secured by wire rope or cable for ease of transportation and/or recovery, reduction in breakage and log loss. Without maintaining the logs in a bundle, they may become separated and individual logs may be lost or broken. It is also clearly more efficient to unload and transport many logs in a single bundle.

Previously, cable retainers or bundling hooks used in such applications have comprised more than one part and threading of the wire rope through a hole in the bundling hook was necessary. In a previous retainer, following the insertion of the cable through an opening in the bundling hook, a wedge was inserted to keep the cable from moving relative to the retainer. The wedge, however, could dislodge upon movement of the log bundle allowing the wire rope and, therefore, the logs to be released. Further, the wire rope frequently bends, becomes frayed or otherwise becomes deformed making it difficult to withdraw the wire rope from the cable receiving aperture in the bundling hook without cutting the cable. This is costly and inefficient.

SUMMARY OF THE INVENTION

According to one aspect of the invention, there is disclosed a cable retainer comprising a body, a first passageway extending from one end of said body to the opposite end along a substantially longitudinal axis, first ferrule retaining means said first passageway, a second passageway extending through said body along a second longitudinal axis and being substantially parallel to said first passageway and an opening between the outside of said body and said second longitudinal passageway.

BRIEF DESCRIPTION OF THE SEVERAL VIEWS OF THE DRAWINGS

A specific embodiment of the invention will now be described, by way of example only, with the use of drawings in which.

DESCRIPTION OF SPECIFIC EMBODIMENT

Figure 1:
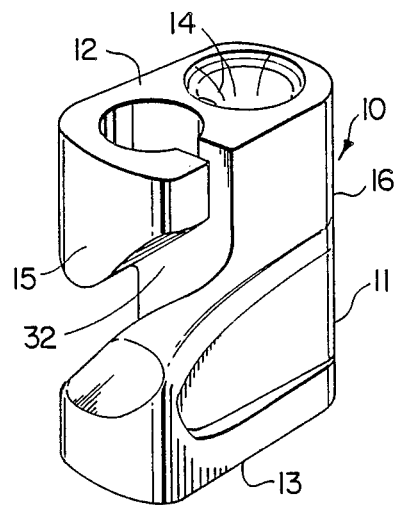
FIG. 1 is an isometric view of the cable retainer or bundling to the invention.
Figure 2:
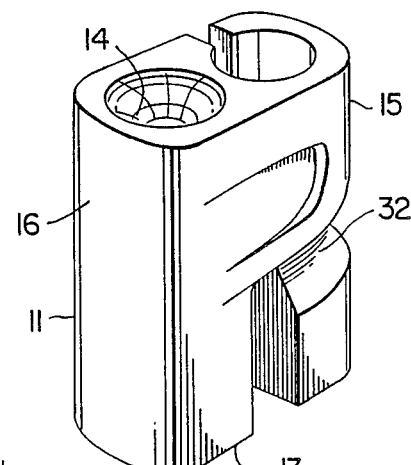
FIG. 2 is an isometric view of the cable retainer of FIG. 1 from a different position.
Figure 3:
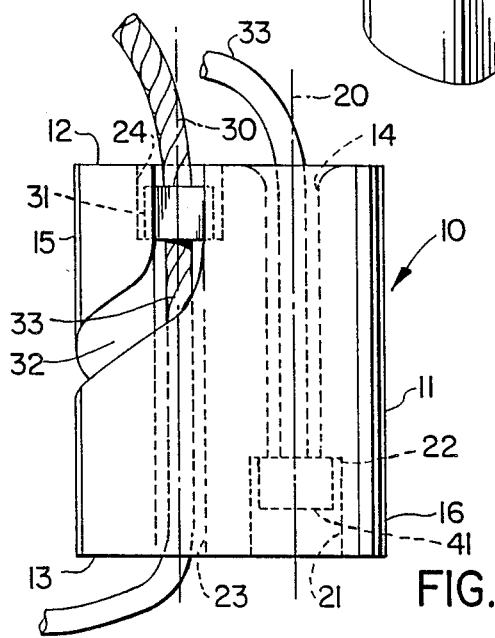
FIG. 3 is a front view of the cable retainer of FIGS. 1 and 2.

Referring now to the drawings, a cable retainer according to the invention and also known as a WILLISTON (Trademark) hook is illustrated generally at 10 in FIGS. 1 and 3. It comprises a body 11 having opposite end faces 12, 13 and opposite sidewalls 15, 16 on the body 11.

A first passageway 14 extends through the body 11 from end face 12 to end face 13 along a first longitudinal axis 20. A bore 21 (FIG. 3) having a diameter somewhat larger than the diameter of the passageway 14 extends along the same axis 20 as the passageway 14 but commences from end face 13. It terminates in a ferrule receiving shoulder 22 as is best seen in FIG. 3.

A second passageway 23 substantially parallel to first passageway 14 extends through the body 10 from end face 12 to end face 13 along longitudinal axis 30. A second bore 24 having a diameter somewhat larger than the diameter of second passageway 23 extends along the same axis 30 as passageway 23 but commences from end face 12. It terminates in a second ferrule receiving shoulder 31, again as best seen in FIG. 3.

A recess or opening 32 is formed from outside the body 11 through sidewall 15 to passageway 23 and has a diagonal portion extending through sidewall 15 with one end of the recess 32 being closest to end face 13 and the other end of recess 32 being closest to end face 12. A second portion 17 is parallel to the axis 30 and extends from each end of the end of the diagonal portion 32 substantially parallel to and into longitudinal passageway 23. Recess 32 extends inwardly from sidewall 15 towards sidewall 16 a distance substantially through second passageway 23 to allow wire rope or cable access to the second longitudinal passageway 23 from sidewall 15 without the necessity of inserting or threading an end of the cable through the passageway 23.

OPERATION

Figure 7:
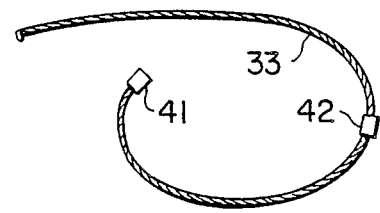
FIG. 7 is a view of the wire rope with an end mounted ferrule and a plurality of ferrules mounted between the ends.

In operation, a wire rope or cable 33 has a ferrule 41 tightly and permanently mounted on one end as seen in FIG. 7. The ferrule 41 is preferably aluminum at the end of cable 33 since, as mentioned, hereafter, it will better seat within the retainer 10 on shoulder 22. The ferrule 41 has a diameter larger than the diameter of bore 21 such that it is inserted into bore 21 only by way of press fit.

The opposite end 43 of cable 33 is threaded through the passageway 14 from end face 13 to end face 12 until the ferrule 41 contacts the end face 13. A hammer (not shown) or other suitable tool is used to hammer the ferrule 41 into the bore 21 until solid contact with the ferrule receiving shoulder 22 is made by one end of the ferrule 41 and the ferrule is securely seated thereon. The ferrule 41 together with its attached cable 33 are then essentially solidly coupled together with the cable retainer 10.

The cable 33 may be of a length as desired by the operator for his particular application which may be dictated by the size, quality and quantity of logs with which the operator intends to form bundles. A plurality of further ferrules 42, preferably made from steel, are mounted to the cable 33 at intervals along the cable 33 from the end ferrule 41 also as desired by the operator for his specific application. The ferrules are made from stainless steel or aluminum pipe having the appropriate inside diameter and are cut to the length desired, generally to 1 to 1 ½ inches. Thereafter, the cable 33 is threaded through the ferrules until the desired position of the ferrules on the cables 33 is reached. A press having a capacity of 200 tons is used to mount the ferrules on the cable 33.

Figure 5:
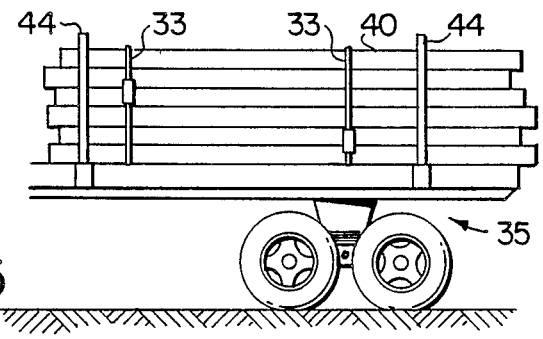
FIG. 5 is a view of the cable retainer in use on a bundle of logs under transport.
Figure 6A:
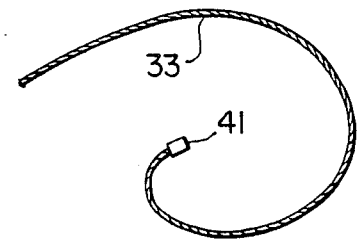
FIG. 6A is a view of the wire rope with only an end mounted ferrule mounted thereon.
Figure 6B:
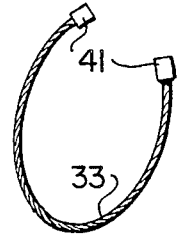
FIG. 6B is a view of the wire rope with two end mounted ferrules.

It will now be assumed that a quantity of logs have been cut and loaded on a transport truck 35 partially illustrated in FIG. 5 where the logs are securely retained by stakes 44 (FIG. 5) as is known.

The operator will then throw the "bundle wire" which comprises the combination of the cable retainer 10, the ferrules 41, 42 and the cable 33, around the logs. The ends of the wire rope 33 are brought together so that the opposite end of cable 33 is in proximity to the cable retainer 10. Cable 33 is snugly hand tightened and cable 33 with its appropriate ferrule 42 is slipped through opening 32 until it is against the wall of the second passageway 23. The cable 33 is straightened until it is parallel with passageway 23 and the ferrule 42 is then seated in the ferrule receiving shoulder 31. There may be two or more of the bundle wires used for each log bundle.

The log bundle is then removed from its position between the stakes 44 on the truck 35. As the log bundle is lifted, the logs will expand thus causing the bundle wire to tighten around the log bundle. The log bundle may then be transported by flotation, for example, or merely stored in bundle form at the log processing site to which they have been transported.

When the operator wishes to remove the bundle wire from the log bundle, the log bundle will be lifted by an appropriate yard machine and the logs within the bundle will be squeezed together. The cable 33 may then be moved around the log bundle until the cable retainer 10 is reached whereupon cable 33 is pushed along axis 30 towards bore 24 to dislodge the ferrule 42 from its seated position in shoulder 31. The ferrule 42 becomes dislodged and the cable 33 is easily removed from passageway 23 through recess or opening 32. The bundle wire is then coiled for future use.

Figure 4:
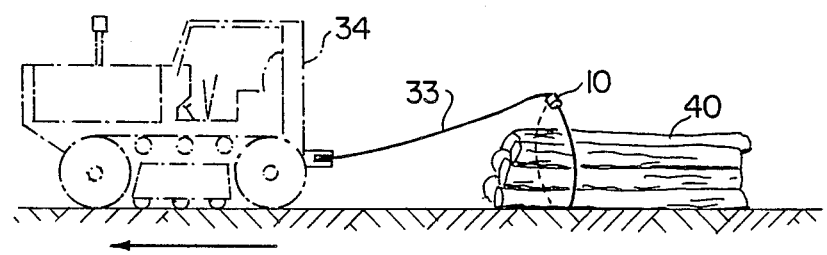
FIG. 4 is a view of the cable retainer in use for choker purposes.

In a further operation according to the invention and with reference to FIG. 4, a cable 33 used in a choker application extends from the rearward end of crawler 34 into the cable retainer 10 where the end ferrule 41 is securely mounted in the ferrule receiving shoulder 22 as previously described.

The cable 33 extends through the cable retainer 10 from end face 12 to end face 13 and the free end of the cable 33 which encircles the log bundle 40 is pushed through the recess 32 until the face of the recess 32 inside the body 11 of the retainer 10 is reached. The cable 33 is merely allowed to assume its unstressed position at which point it will extend along passageway 23 between end faces 12, 13. The retainer 10 then will simply slide along cable 33 as the crawler moves away from the log bundle.

As the crawler 34 moves away from the log bundle 40, the cable 33 will tighten and the retainer 10, under the influence of ferrule 41 on ferrule receiving shoulder 22 will cause the retainer 10 to slide on cable 33 towards the log bundle 40 until the cable 33 is tight and the log bundle 40 begins to move with the crawler 34. When the desired location is reached, the cable 33 is slackened, the retainer 10 is moved relative to the cable 33 and the cable 33 is removed from the retainer 10 through opening 32. The bundle 40 will then merely be dropped.

In this choker application, no ferrule receiving shoulder 31 in the second passageway 23 or further ferrules 42 on cable 33 are required because the cable 33 is intended to move smoothly in passageway 23 until the cable 33 is tightened.

A practical method of mounting the ferrules 41, 42 on the cable 33 is mount one ferrule 41, preferably made from aluminum for seating purposes within the retainer 10 as previously described, and to mount a plurality of ferrules 42, preferably steel also as described above, on the opposite end of the cable 33 at regular intervals such that an adjustment is readily available to the operator when the cable 33 is mounted on a log bundle. For example, if the cable is 45 feet long, an aluminum ferrule 41 will be mounted on one end. The last 10 feet of the opposite end will have a ferrule 42 mounted each 2 or 3 feet for adjustment purposes.

A further technique which is useful is to use, say, two or more cables 33 with an additional retainer 10. If a 90 foot cable is required, for example, and two 45 foot cables are available, one cable 33 may be mounted in the retainer 10 as described and, on the opposite end of the cable 33, another retainer 10 may be used with a second cable 33 extending therefrom. The end of the second cable 33 may then be again connected to the first retainer 10.

Many other modifications to the invention will readily occur to those skilled in the art and, while specific embodiments of the invention have been described, such descriptions should be taken as illustrative of the invention only and not as limiting its scope as properly defined in accordance with the accompanying claims.

What is claimed is:

1. A cable retainer comprising a body, a first passageway extending from one end of said body to the opposite end of said body along a substantially longitudinal axis, a first ferrule receiving shoulder in said first passageway, a second passageway extending through said body along a second longitudinal axis and being substantially parallel to said first passageway, a second ferrule receiving shoulder in said second passageway and an opening between the outside of said body and said second longitudinal passageway, said opening being inclined to the axis of said second passageway.

2. A cable retainer as in claim 1 wherein said opening extends into said body a distance substantially through said second longitudinal passageway.

3. A cable retainer as in claim 2 wherein said opening is generally longitudinal, the axis of said opening being inclined approximately 45 degrees to the axis of said second passageway.

4. A cable retainer as in claim 1 wherein said first ferrule receiving shoulder faces a first direction in said first passageway and said second ferrule receiving shoulder faces an opposite direction to said first direction in said second passageway.

5. A cable retainer as in claim 4 wherein said first ferrule receiving shoulder is positioned at one end of said body in said first passageway and said second ferrule receiving shoulder is positioned at the opposite end of said body in said second passageway.

* * * * *